United States Patent [19]

Shimomura

[11] Patent Number: 5,349,634
[45] Date of Patent: Sep. 20, 1994

[54] FACSIMILE APPARATUS

[75] Inventor: Hiroki Shimomura, Fukuoka, Japan

[73] Assignee: Matsushita Electric Industrial Co., Ltd., Osaka

[21] Appl. No.: 769,269

[22] Filed: Oct. 1, 1991

[30] Foreign Application Priority Data

Oct. 18, 1990 [JP] Japan .................... 2-281172

[51] Int. Cl.⁵ .................................. H04M 11/00
[52] U.S. Cl. ........................ 379/100; 379/67; 379/97; 358/434; 358/438
[58] Field of Search .......... 379/100, 96, 97, 98, 379/93, 94; 358/434, 438

[56] References Cited

U.S. PATENT DOCUMENTS

| | | | |
|---|---|---|---|
| 4,800,439 | 1/1989 | Yoshino | 379/100 |
| 4,823,375 | 4/1989 | Yoshida | 379/93 |
| 4,868,865 | 9/1989 | Ogawa et al. | 379/100 |
| 4,908,851 | 2/1990 | Kotani | 379/96 |
| 5,022,071 | 6/1991 | Mozer et al. | 379/102 |
| 5,036,534 | 7/1991 | Gural | 379/93 |
| 5,086,455 | 2/1992 | Satomi et al. | 379/100 |
| 5,131,026 | 7/1992 | Park | 379/100 |
| 5,146,489 | 9/1992 | Telibasa | 379/100 |

FOREIGN PATENT DOCUMENTS 1261072 10/1989 Japan .
0318455 12/1989 Japan ......................... 379/100

Primary Examiner—Curtis Kuntz
Assistant Examiner—Stella L. Woo
Attorney, Agent, or Firm—Lowe, Price, LeBlanc & Becker

[57] ABSTRACT

A facsimile apparatus includes a facsimile communication section for executing facsimile communication, a calling tone signal detecting section for detecting a first signal in a frequency band corresponding to a frequency band of a calling tone signal, a speech signal detecting section for detecting a second signal in a frequency band outside the frequency band of the calling tone signal, and a control section for starting and activating the facsimile communication section to execute the facsimile communication when the calling tone signal detecting section detects the first signal but the speech signal detecting section does not detect the second signal.

10 Claims, 3 Drawing Sheets

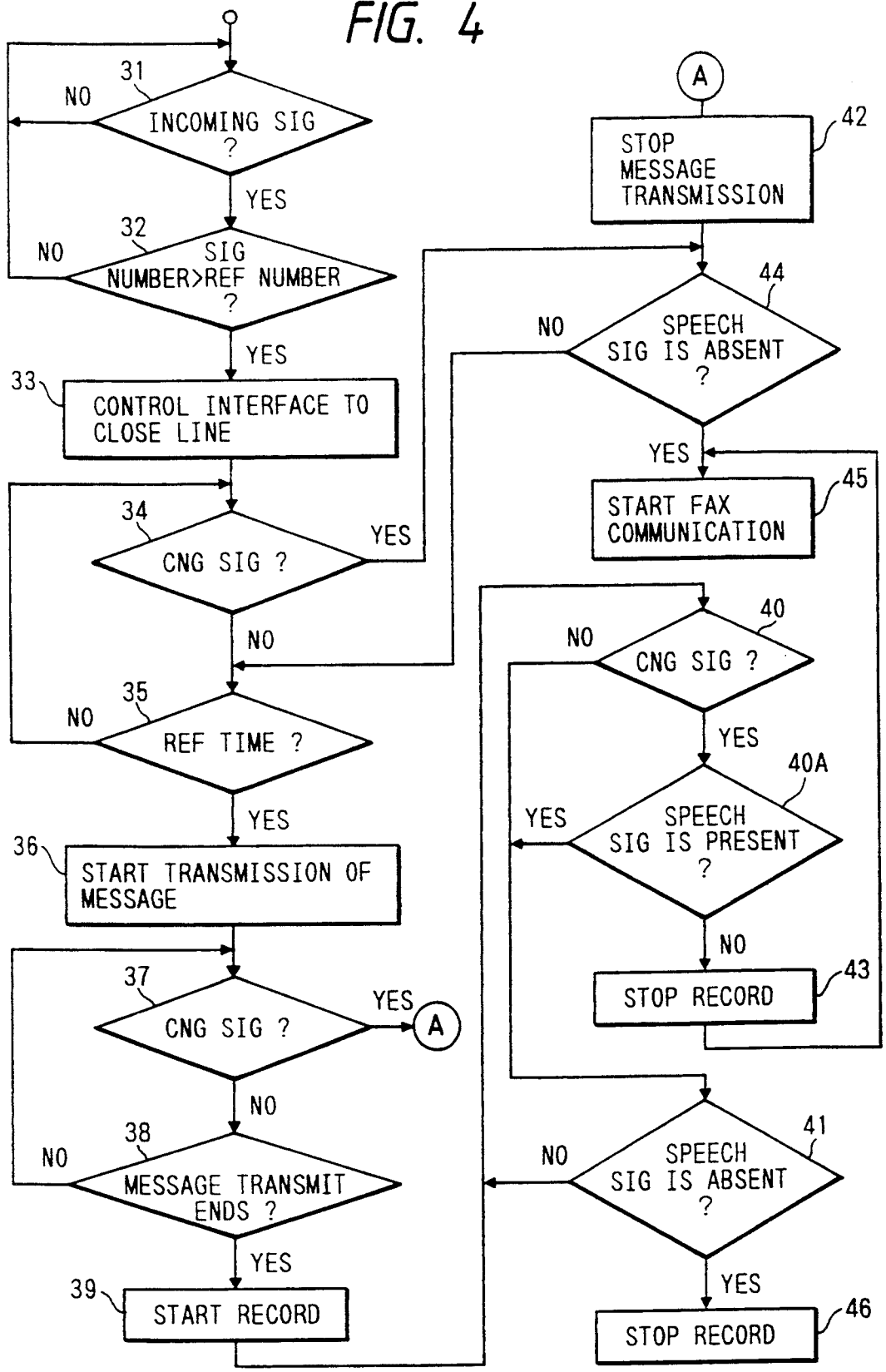

FACSIMILE APPARATUS

BACKGROUND OF THE INVENTION

This invention relates to a facsimile apparatus for facsimile communication via a telephone line or others.

Some of known facsimile apparatuses for facsimile communication via a telephone line have a speech or voice response function. As will be explained later, prior art facsimile apparatuses with a voice response function have some problems.

SUMMARY OF THE INVENTION

It is an object of this invention to provide an improved facsimile apparatus.

A first aspect of this invention provides a facsimile apparatus comprising facsimile communication means for executing facsimile communication; calling tone signal detecting means for detecting a first signal in a frequency band corresponding to a frequency band of a calling tone signal; speech signal detecting means for detecting a second signal in a frequency band outside the frequency band of the calling tone signal; and control means for starting and activating the facsimile communication means to execute the facsimile communication when the calling tone signal detecting means detects the first signal but the speech signal detecting means does not detect the second signal.

A second aspect of this invention provides a facsimile apparatus comprising facsimile communication means for executing facsimile communication; calling tone signal detecting means for detecting a first signal in a frequency band corresponding to a frequency band of a calling tone signal; speech signal detecting means for detecting a second signal in a frequency band outside the frequency band of the calling tone signal; and control means for starting and activating the facsimile communication means to execute the facsimile communication in cases where the calling tone signal detecting means detects the first signal but the speech signal detecting means continues to not detect the second signal for a predetermined time.

A third aspect of this invention provides a facsimile apparatus comprising facsimile communication means for executing facsimile communication; message transmitting means for transmitting a response message; calling tone signal detecting means for detecting a first signal in a frequency band corresponding to a frequency band of a calling tone signal; speech signal detecting means for detecting a second signal in a frequency band outside the frequency band of the calling tone signal; and control means for activating the message transmitting means to transmit the response message in cases where the calling tone signal detecting means continues to not detect the first signal for a first predetermined time, and for starting and activating the facsimile communication means to execute the facsimile communication in cases where the calling tone signal detecting means detects the first signal during said transmitting the response message but the speech signal detecting means continues to not detect the second signal for a second predetermined time.

A fourth aspect of this invention provides a facsimile apparatus comprising facsimile communication means for executing facsimile communication; message transmitting means for transmitting a response message; recording means for recording a matter; calling tone signal detecting means for detecting a first signal in a frequency band corresponding to a frequency band of a calling tone signal; speech signal detecting means for detecting a second signal in a frequency band outside the frequency band of the calling tone signal; and control means for activating the message transmitting means to transmit the response message and then activating the recording means to record the matter in cases where the calling tone signal detecting means continues to not detect the first signal for a first predetermined time, and for stag and activating the facsimile communication means to execute the facsimile communication in cases where the calling tone signal detecting means detects the first signal during said recording the matter but the speech signal detecting means continues to not detect the second signal for a second predetermined time.

A fifth aspect of this invention provides a facsimile apparatus comprising facsimile communication means for executing facsimile communication; message transmitting means for transmitting a response message; recording-means for recording a matter; calling tone signal detecting means for detecting a first signal in a frequency band corresponding to a frequency band of a calling tone signal; speech signal detecting means for detecting a second signal in a frequency band outside the frequency band of the calling tone signal; and control means for activating the message transmitting means to transmit the response message and then activating the recording means to record the matter in cases where the calling tone signal detecting means continues to not detect the first signal for a first predetermined time, for deactivating the message transmitting means and the recording means in cases where the calling tone signal detecting means detects the first signal during said transmitting the response message and during said recording the matter, and for starting and activating the facsimile communication means to execute the facsimile communication in cases where the calling tone signal detecting means detects the first signal but the speech signal detecting means continues to not detect the second signal for a second predetermined time.

A sixth aspect of this invention provides a facsimile apparatus comprising first means for detecting a presence and an absence of a calling tone signal; second means for detecting a presence and an absence of a speech signal; and third means for enabling facsimile communication in cases where the first means detects the presence of the calling tone signal and the second means detects the absence of the speech signal.

BRIEF DESCRIPTION OF THE DRAWINGS

FIG. 4 is a flowchart of a program operating the controller of FIG. 3.

DESCRIPTION OF THE PRIOR ART

Figure 1:
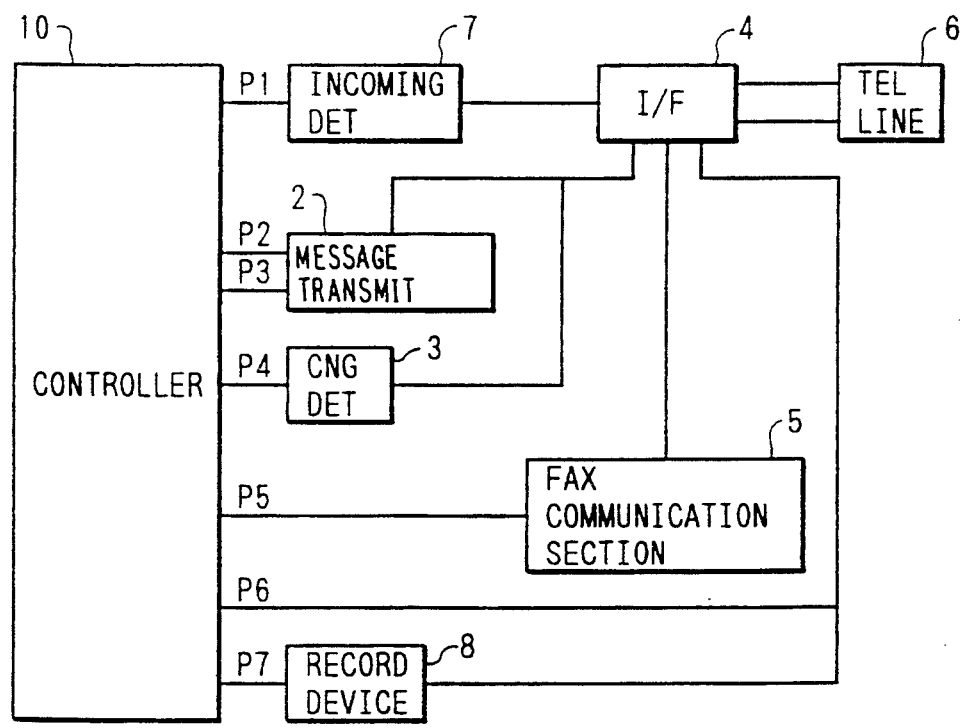
FIG. 1 is a block diagram-of a prior art facsimile apparatus with a voice response function.

With reference to FIG. 1, a prior art facsimile apparatus with a voice response function includes an interface 4, a call incoming signal detector 7, a response message transmitter 2, a CNG (calling tone) signal detector 3, a facsimile communication section 5, a recording device 8, and a controller 10.

The interface 4 is connected to a telephone line 6. The call incoming signal detector 7 functions to detect a call incoming signal which is transmitted from the telephone line 6 via the interface 4. The response message transmitter 2 serves to transmit a voice message in response to the call incoming signal which is detected by the call incoming signal detector 7. The CNG signal detector 3 functions to detect a calling tone signal (a CNG signal) which is transmitted from the telephone line 6 via the interface 4. The CNG signal detector 3 includes a band pass filter tuned so as to pass a signal in a frequency band corresponding to the frequency band of the CNG signal. Specifically, the band pass filter within the CNG signal detector 3 passer signals having frequencies of 1,100±38 Hz. The facsimile communication section 5 operates to execute facsimile communication. The recording device 8 serves to record a signal representative of a matter from the other party of communication.

The controller 10 receives output signals from the response message transmitter 2, the CNG signal detector 3, and the call incoming signal detector 7, and controls the response message transmitter 2, the interface 4, the facsimile communication section 5, and the recording device 8 in response to the received signals. The controller 10 includes a microcomputer having a combination of a processing section, a ROM, a RAM, and an input/output section. The controller 10 operates in accordance with a program stored in the ROM.

The prior art facsimile apparatus of FIG. 1 operates as follows. When the call incoming signal detector 7 detects a call incoming signal transmitted from the telephone line 6 via the interface 4, the call incoming signal detector 7 outputs a detection signal to the controller 10 via an input terminal P1 of the controller 10 to inform the controller 10 of the detection of the call incoming signal. The controller 10 counts the number of times of the detection of the call incoming signal in response to the output signal from the call incoming signal detector 7. When the counted number of times of the detection of the call incoming signal reaches a predetermined reference number, the controller 10 outputs an instruction signal to the interface 4 via an output terminal P6 so that the interface 4 will close the telephone line 6. Then, the controller 10 monitors its input terminal P4 in order to decide whether or not this call is transmitted from a facsimile machine. It should be noted that the input terminal P4 of the controller 10 is connected to the output terminal of the CNG signal detector 3.

Figure 2:
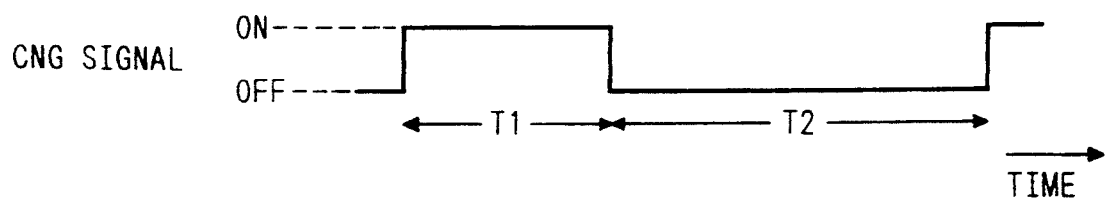
FIG. 2 is a time-domain diagram showing the waveform of a calling tone signal.

In the case of facsimile communication, the call incoming signal is usually followed by a CNG signal. The CNG signal has frequencies of 1,100±38 Hz. The CNG signal includes a train of pulses. As shown in FIG. 2, the CNG signal assumes an on state during first intervals T1 of 425-575 ms, and assumes an off state during second intervals T2 of 2,550-3,450 ms.

A CNG signal travels from the telephone line 6 to the CNG signal detector 3 via the interface 4. Then, the CNG signal passes through the band pass filter within the CNG signal detector 3 and reaches the input terminal P4 of the controller 10. In the case where the controller 10 continues to receive the CNG signal for a predetermined reference time, the controller 10 judges the CNG signal to be good and outputs an instruction signal to the facsimile communication section 5 via an output terminal P5 to enable facsimile communication.

The predetermined reference time is chosen so that the Judgment on a CNG signal can be reliable. The facsimile communication section 5 generally executes facsimile communication with the other party via the interface 4 and the telephone line 6.

On the other hand, in the case where the controller 10 does not receive any CNG signal for the predetermined reference time after the interface 4 closes the telephone line 6, or in the case where the controller 10 does not continue to receive the CNG signal for the predetermined reference time, the controller 10 outputs an instruction signal to the response message transmitter 2 via an output terminal P2 so that the response message transmitter 2 will output a voice response message. The output response message from the response message transmitter 2 is transmitted to the telephone line 6 via the interface 4. When outputting the response message is completed, the response message transmitter 2 outputs a message transmission end signal to the controller 10 via an input terminal P3 of the controller 10. Upon the reception of the message transmission end signal, the controller 10 outputs an instruction signal to the recording device 8 via an output terminal P7 to activate the recording device 8. As a result, the recording device 8 can record a matter from the other party of communication which is transmitted via the telephone line 6 and the interface 4.

In the case where the predetermined reference time for the judgment on a CNG signal corresponds to one period of the CNG signal, the judgment tends to be adversely affected by a voice from a calling side or noise on the telephone line 6. Accordingly, the predetermined reference time is generally set adequately longer than one period of the CNG signal to attain a high reliability of the judgment on the CNG signal. Thus, a long time tends to be spent before the start of facsimile communication.

Another prior art facsimile apparatus repeats a detection and decision process on a CNG signal a predetermined number of times in order to increase the reliability of the Judgment on the CNG signal. Also, in this prior art facsimile apparatus, a long time is generally spent before the start of facsimile communication.

In an advanced prior art facsimile apparatus, a facsimile reception signal is outputted to a telephone line before a voice response message is transmitted. In the absence of an answer to the output facsimile reception signal, the other party of communication is judged to be different from a facsimile machine so that the transmission of the voice response message is executed. In the presence of an answer to the output facsimile reception signal, the other party of communication is judged to be a facsimile machine so that the transmission of the voice response message is unexecuted. However, the advanced prior art facsimile apparatus has the following problem. When the other party of communication is a person, the other party tends to ring off the telephone in response to the output facsimile reception signal. Thus, in most cases, a matter from the other party is not recorded into a recording device.

DESCRIPTION OF THE PREFERRED EMBODIMENT

Figure 3:
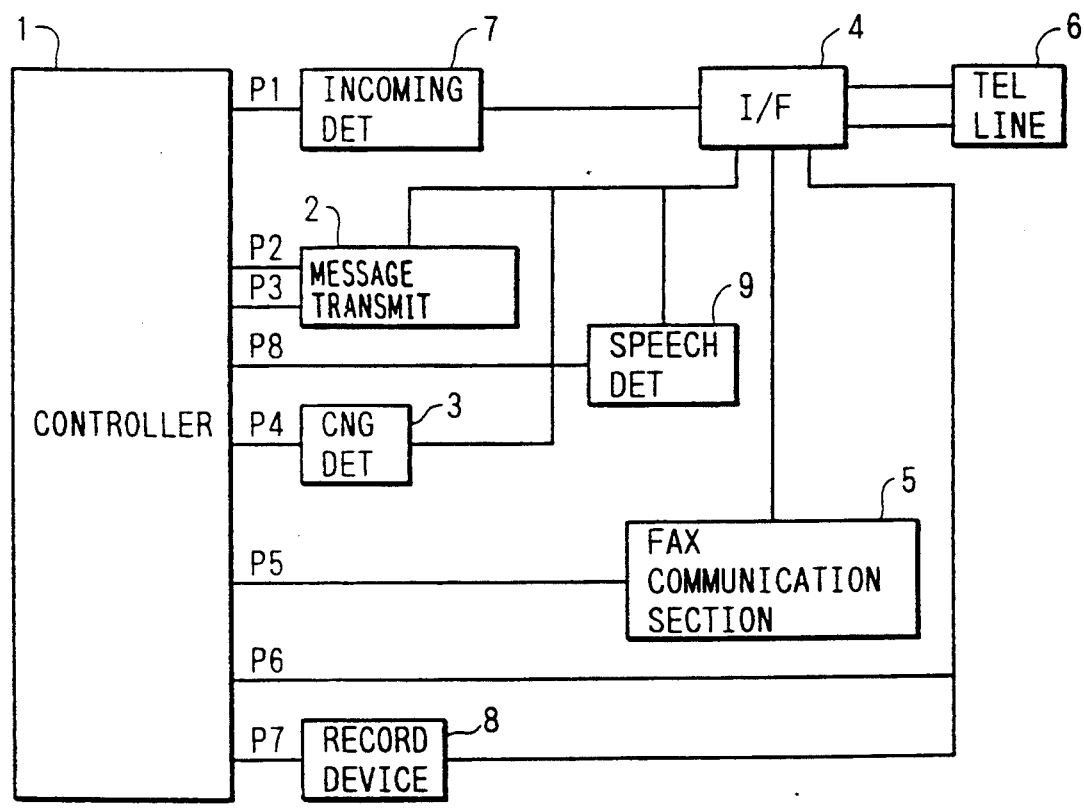
FIG. 3 is a block diagram of a facsimile apparatus with a voice response function according to an embodiment of this invention.

With reference to FIG. 3, a facsimile apparatus with a voice response function includes a controller 1, a response message transmitter 2, a CNG (calling tone) signal detector 3, an interface 4, a facsimile communication section 5, a call incoming signal detector 7, a recording device 8, and a speech signal detector 9. The interface 4 is connected to a telephone line 6. In the facsimile apparatus of FIG. 3, the devices 2, 3, 5, 7, 8, and 9 are connected between the interface 4 and the controller 1.

The call incoming signal detector 7 functions to detect a call incoming signal which is transmitted from the telephone line 6 via the interface 4. The response message transmitter 2 serves to transmit a voice message in response to the call incoming signal which is detected by the call incoming signal detector 7. The CNG signal detector 3 functions to detect a calling tone signal (a CNG signal) which is transmitted from the telephone line 6 via the interface 4. The CNG signal detector 3 includes a band pass filter tuned to pass a signal in a frequency band corresponding to the frequency band of the CNG signal. Specifically, the band pass filter within the CNG signal detector 3 passes signals having frequencies of 1,100±38 Hz. Since a CNG signal has frequencies of 1,100±38 Hz, the CNG signal is selected by and passed through the CNG signal detector 3. The facsimile communication section 5 operates to execute facsimile communication. The recording device 8 serves to record a signal representative of a matter from the other party of communication. The speech signal detector 9 functions to detect a speech signal which is transmitted from the telephone line 6 via the interface 4. The speech signal detector 9 includes a complex band pass filter tuned to pass signals in frequency bands outside the frequency band of the CNG signal. Specifically, the complex band pass filter passes signals in a frequency band of 300 to 1,062 (1,100−38) Hz and a frequency band of 1,138 (1,100+38) to 3,400 Hz.

The controller 1 receives output signals from the response message transmitter 2, the CNG signal detector 3, the call incoming signal detector 7, and the speech signal detector 9, and controls the response message transmitter 2, the interface 4, the facsimile communication section 5, and the recording device 8 in response to the received signals. The controller 1 includes a microcomputer having a combination of a processing section, a ROM, a RAM, and an input/output section. The controller 1 operates in accordance with a program stored in the ROM.

FIG. 4 is a flowchart of a part of the program operating the controller 1. As shown in FIG. 4, a first step 31 of the part of the program decides whether or not a call incoming signal is received by referring to the output signal from the incoming signal detector 7. When the call incoming signal is received, the program advances to a step 32. Otherwise, the program repeats the step 31.

The step 32 compares the number of times of the reception of the call incoming signal with a predetermined reference number. When the number of times of the reception of the call incoming signal is equal to or smaller than the predetermined reference number, the program returns to the step 31. When the number of times of the reception of the call incoming signal is greater than the predetermined reference number, the program advances to a step 33.

The step 33 controls the interface 4 so that the interface 4 will close the telephone line 6. After the step 33, the program advances to a step 34.

The step 34 decides whether or not a CNG signal is received, that is, whether or not a CNG signal is present, by referring to the output signal from the CNG signal detector 3. When the CNG signal is received, that is, when the CNG signal is present, the program advances to a step 44. When the CNG signal is not received, that is, the CNG signal is absent, the program advances to a step 35.

The step 35 decides whether or not a predetermined reference time has elapsed from the moment of closing the telephone line 6. When the predetermined reference time has elapsed, the program advances to a step 36. When the predetermined reference time has not elapsed yet, the program returns to the step 34.

The step 36 activates the response message transmitter 2 so that the response message transmitter 2 will output a voice response message. After the step 36, the program advances to a step 37.

The step 37 decides whether or not a CNG signal has been continuously received for a predetermined reference time, that is, whether or not a CNG signal has been present for a predetermined reference time, by referring to the output signal from the CNG signal detector 3. When the CNG signal has been continuously received for the predetermined reference time, that is, when the CNG signal has been present for the predetermined reference time, the program advances to a step 42. Otherwise, the program advances to a step 38.

The step 38 decides whether or not outputting the voice response message is completed by referring to the output signal from the response message transmitter 2. It should be noted that the response message transmitter 2 outputs a message transmission end signal when outputting the voice response message is completed. When outputting the voice response message is completed, the program advances to a step 39. Otherwise, the program returns to the step 37.

The step 39 activates the recording device 8 so that the recording device 8 can record a matter from the other party of communication. After the step 39, the program advances to a step 40.

The step 40 decides whether or not a CNG signal has been continuously received for a predetermined reference time, that is, whether or not a CNG signal has been present for a predetermined reference time, by referring to the output signal from the CNG signal detector 3. When the CNG signal has been continuously received for the predetermined reference time, that is, when the CNG signal has been present for the predetermined reference time, the program advances to a step 40A. Otherwise, the program advances to a step 41.

The step 40A decides whether or not a speech signal is present by referring to the output signal from the speech signal detector 9. When the speech signal is present, the program advances to the step 41. Otherwise, the program advances to a step 43.

The step 41 decides whether or not a speech signal have been continuously absent for a predetermined reference time by referring to the output signal from the speech signal detector 9. When the speech signal have been continuously absent for the predetermined reference time, the program advances to a step 46. Otherwise, the program returns to the step 40.

The step 46 deactivates the recording device 8 so that the recording device 8 will stop the operation of recording a matter from the other party of communication. After the step 46, the program advances to a subsequent step (not shown).

The step 42 deactivates the response message transmitter 2 so that the response message transmitter 2 will stop outputting a voice response message. After the step 42, the program advances to the step 44.

The step 43 deactivates the recording device 8 so that the recording device 8 will stop the operation of recording a matter from the other party of communication. After the step 43, the program advances to a step 45.

The step 44 decides whether or not a speech signal have been continuously absent for a predetermined reference time by referring to the output signal from the speech signal detector 9. When the speech signal have been continuously absent for the predetermined reference time, the program advances to the step 45. Otherwise, the program returns to the step 35.

The step 45 controls the facsimile communication section 5 so that the facsimile communication section 5 can start facsimile communication. After the step 45, the program advances to a subsequent step (not shown).

The operation of the facsimile apparatus will be further described with reference to FIGS. 3 and 4. When the call incoming signal detector 7 detects a call incoming signal transmitted from the telephone line 6 via the interface 4, the call incoming signal detector 7 outputs a detection signal to the controller 1 via an input terminal P1 of the controller 1 to inform the controller 1 of the detection of the call incoming signal. The controller 1 recognizes the detection of the call incoming signal by the step 31. The controller 1 counts the number of times of the detection of the call incoming signal in response to the output signal from the call incoming signal detector 7. When the counted number of times of the detection of the call incoming signal reaches a predetermined reference number, the controller 1 outputs an instruction signal to the interface 4 via an output terminal P6 so that the interface 4 will close the telephone line 6. This process is executed by the steps 32 and 33.

In general, after the interface 4 closes the telephone line 6, a speech signal or a CNG signal is transmitted via the telephone line 6. In the case of facsimile communication, a CNG signal is normally transmitted. The controller 1 executes a process of deciding whether or not a subsequently-received signal agrees with a CNG signal, that is, a process of deciding whether or not this call is transmitted from a facsimile machine. Specifically, the controller 1 monitors its input terminal P4 which receives the output signal from the CNG signal detector 3. The controller 1 decides whether or not a CNG signal is received, that is, whether or not a CNG signal is present, by referring to the output signal from the CNG signal detector 3. This process is executed by the step 34. Monitoring the input terminal P4 is continued by the operation of the step 35 for a predetermined reference time after the telephone line 6 is closed by the step 33. The CNG signal detector 3 uses the band pass filter in detecting a CNG signal. As described previously, the band pass filter within the CNG signal detector 3 passes a signal in a frequency band corresponding to the frequency band of the CNG signal. Specifically, the band pass filter within the CNG signal detector 3 passes signals having frequencies of 1,100±38 Hz. A CNG signal travels from the telephone line 6 to the CNG signal detector 3 via the interface 4. Then, the CNG signal passes through the band pass filter within the CNG signal detector 3, and reaches the input terminal P4 of the controller 1 as an output detection signal from the CNG signal detector 3.

When the controller 1 receives the output detection signal from the CNG signal detector 3 via the input terminal P4, the controller 1 monitors its input terminal P8 which receives the output signal from the speech signal detector 9. This process is executed by the step 44. In addition, monitoring the output signal from the CNG signal detector 3 via the input terminal P4 is continued. The output signal from the speech signal detector 9 represents the detection of a signal in a frequency band outside the frequency band of the CNG signal. The controller 1 decides whether or not a speech signal have been continuously absent for a predetermined reference time by referring to the output signal from the speech signal detector 9. This process is executed by the step 44.

In the case where the CNG signal continues to be received for a predetermined reference time but the speech signal continues to be absent for a predetermined reference time, the controller 1 judges the current call to be transmitted from a facsimile machine, and outputs an instruction signal to the facsimile communication section 5 via an output terminal P5 to enable and start facsimile communication. This process is executed by the step 45. On the other hand, in the case where the CNG signal does not continue to be received for a predetermined reference time, or in the case where the speech signal does not continue to be absent for a predetermined reference time, the program advances or returns to the step 35.

In the case where a CNG signal continues to be absent for the predetermined reference time after the step 33 closes the telephone line 6, the controller 1 outputs an instruction signal to the response message transmitter 2 via an output terminal P2 so that the response message transmitter 2 will output a voice response message. This process is executed by the step 36. The output response message from the response message transmitter 2 is transmitted to the telephone line 6 via the interface 4. For example, the voice response message is designed so as to inform the other party of communication that a matter from the other party can be recorded. The controller 1 continues to monitor the output signal from the CNG signal detector 3 via its input terminal P4. This process is executed by the step 37.

In the case where the output detection signal from the CNG signal detector 3 is decided to be continuously present for a predetermined time by the step 37, the controller 1 outputs an instruction signal to the response message transmitter 2 via an output terminal P2 so that the response message transmitter 2 will stop the operation of outputting the voice response message. This process is executed by the step 42. Then, the controller 1 advances the program to the step 44. When outputting the response message is completed, the response message transmitter 2 outputs a message transmission end signal to the controller 1 via an input terminal P3 of the controller 1. In the case where the output detection signal from the CNG signal detector 3 is decided to be not continuously present for the predetermined reference time, upon the reception of the message transmission end signal (see the step 38), the controller 1 outputs an instruction signal to the recording device 8 via an output terminal P7 to activate the recording device 8. This process is executed by the step 39. As a result, the recording device 8 can record a mater from the other party of communication which is transmitted via the telephone line 6 and the interface 4.

During the recording of the matter from the other party of communication, the controller 1 continues to monitor the output signals from the CNG signal detector 3 and the speech signal detector 9 via the input terminals P4 and P8. In the case where the CNG signal is decided to be continuously present for a predetermined reference time by the step 40 and where a speech signal is decided to be absent by the step 40A, the controller 1 outputs an instruction signal to the recording device 8 so as to suspend the recording device 8. This process is executed by the step 43. Then, the controller 1 advances the program to the step 45. Furthermore, in the case where a speech signal is decided to be continuously absent for a predetermined reference time by tile step 41, the controller outputs an instruction signal to the recording device 8 so as to suspend the recording device 8. This process is executed by the step 46.

As described previously, this embodiment includes the speech signal detector 9. Both the CNG signal detector 3 and the speech signal detector 9 are used in judging whether or not a call is transmitted from a facsimile machine. Therefore, the judgment is generally more reliable than the judgment using only the CNG signal detector.

This embodiment may be modified as follows. A modification of this embodiment includes a telephone set. In the case where a call is not transmitted from a facsimile machine, ringing the bell of the telephone set is done in place of recording a matter from the other party of communication.

What is claimed is:

1. A facsimile apparatus comprising:
facsimile communication means for executing facsimile communication;
calling tone signal detecting means for detecting a presence and an absence of a first signal in a frequency band corresponding to a frequency band of a calling tone signal;
speech signal detecting means for detecting a presence and an absence of a second signal in a frequency band outside the frequency band of the calling tone signal; and
control means for starting and activating the facsimile communication means to execute the facsimile communication in cases where the calling tone signal detecting means continues to detect the presence of the first signal and simultaneously the speech signal detecting means continues to detect the absence of the second signal within a predetermined time period initiated after closing a telephone line.

2. A facsimile apparatus comprising:
facsimile communication means for executing facsimile communication;
message transmitting means for transmitting a response message;
calling tone signal detecting means for detecting a presence and an absence of a first signal in a frequency band corresponding to a frequency band of a calling tone signal;
speech signal detecting means for detecting a presence and an absence of a second signal in a frequency band outside the frequency band of the calling tone signal; and
control means for activating the message transmitting means to transmit the response message in cases where the calling tone signal detecting means continues to detect the absence of the first signal for a first predetermined time, and for starting and activating the facsimile communication means to execute the facsimile communication in cases where the calling tone signal detecting means continues to detect the presence of the first signal during said transmitting of the response message and simultaneously the speech signal detecting means continues to detect the absence of the second signal for a second predetermined time.

3. A facsimile apparatus comprising:
facsimile communication means for executing facsimile communication;
message transmitting means for transmitting a response message;
recording means for recording a matter;
calling tone signal detecting means for detecting a presence and an absence of a first signal in a frequency band corresponding to a frequency band of a calling tone signal;
speech signal detecting means for detecting a presence and an absence of a second signal in a frequency band outside the frequency band of the calling tone signal; and
control means for activating the message transmitting means to transmit the response message and then activating the recording means to record the matter in case where the calling tone signal detecting means continues to detect the absence of the first signal for a first predetermined time, and for starting and activating the facsimile communication means to execute the facsimile communication in cases where the calling tone signal detecting means continues to detect the presence of the first signal during said recording the matter and simultaneously the speech signal detecting means continues to detect the absence of the second signal for a second predetermined time.

4. A facsimile apparatus comprising:
facsimile communication means for executing facsimile communication;
message transmitting means for transmitting a response message;
recording means for recording a matter;
calling tone signal detecting means for detecting a presence and an absence of a first signal in a frequency band corresponding to a frequency band of a calling tone signal;
speech signal detecting means for detecting a presence and an absence of a second signal in a frequency band outside the frequency band of the calling tone signal; and
control means for activating the message transmitting means to transmit the response message ad then activating the recording means to record the matter in cases where the calling tone signal detecting means continues to detect the absence of the first signal for a first predetermined time, for deactivating the message transmitting means and the recording means in cases where the calling tone signal detecting means detects the presence of the first signal during said transmitting the response message and during said recording the matter, and for starting and activating the facsimile communication means to execute the facsimile communication in cases where the calling tone signal detecting means continues to detect the presence of the first signal and simultaneously the speech signal detecting means continues to detect the absence of the second signal for a second predetermined time.

5. A facsimile apparatus comprising:
a first means for detecting a presence and an absence of a calling tone signal;
second means for detecting a presence and an absence of a speech signal; and third means for enabling facsimile communication in cases wherein the first means detects the presence of the calling tone signal and the second means detects the absence of the speech signal;

wherein the third means comprises means for enabling the facsimile communication in cases where the first means continues to detect the presence of the calling tone signal and simultaneously the second means continues to detect the absence of the speech signal for a predetermined time.

6. A facsimile apparatus comprising:

facsimile communication means for executing facsimile communication;

calling tone signal detecting means for detecting a presence and an absence of a first signal in a frequency band corresponding to a frequency band of a calling tone signal;

speech signal detecting means for detecting a presence and an absence of a second signal in a frequency band outside the frequency band of the calling tone signal; and control means for deciding whether the speech signal detecting means detects the presence or the absence of the second signal after the calling tone signal detecting means detects the present of the first signal, and for starting and activating the facsimile communication means to execute the facsimile communication in cases where the calling tone signal detecting means detects the presence of the first signal and the speech signal detecting means simultaneously continues to detect the absence of the second signal for a predetermined time.

7. The facsimile apparatus of claim 6, further comprising message transmitting means for transmitting a response message, and wherein the control means comprises means for activating the message transmitting means to transmit the response message in cases where the calling tone signal detecting means continues to detect the absence of the first signal for a second predetermined time.

8. A facsimile apparatus comprising:

message transmitting means for transmitting a response message;

recording means for recording a matter;

calling tone signal detecting means for detecting a presence and an absence of a first signal in a frequency band corresponding to a frequency band of a calling tone signal;

speech signal detecting means for detecting a presence and an absence of a second signal in a frequency band outside the frequency band of the calling tone signal; and control means for activating the message transmitting means to transmit the response message when the absence of the calling tone signal is detected for a predetermined time, for deciding whether the calling tone signal detecting means detects the presence or the absence of the first signal during transmission of the response message by the message transmitting means, for interrupting the transmission of the response message when the calling tone signal detecting means detects the presence of the first signal, for activating the recording means to record the matter after the transmission of the response message by the message transmitting means is completed, for deciding whether the calling tone signal detecting means detects the presence or the absence of the first signal during recording of the matter by the recording means, for deciding whether the speech signal detecting means detects the presence or the absence of the second signal during the recording of the matter by the recording means, and for interrupting the recording of the matter by the recording means when the calling tone signal detecting means continues to detect the presence of the first signal and simultaneously the speech signal detecting means continues to detect the absence of the second signal for a predetermined time.

9. A facsimile apparatus comprising:

facsimile communication means for executing facsimile communication;

message transmitting means for transmitting a response message;

calling tone signal detecting means for detecting a presence and an absence of a first signal in a frequency band corresponding to a frequency band of a calling tone signal;

speech signal detecting means for detecting a presence and an absence of a second signal in a frequency band outside the frequency band of the calling tone signal; and control means for activating the message transmitting means to transmit the response message, for deactivating the message transmitting means to interrupt sad transmission of the response message when the calling tone signal detecting means detects the presence of the first signal during the transmission of the response message, and for starting and activating the facsimile communication means to execute the facsimile communication in cases where the calling tone signal detecting means continues to detect the presence of the first signal during said transmitting of the response message and simultaneously the speech signal detecting means continues to detect the absence of the second signal for a second predetermined time.

10. A facsimile apparatus comprising:

facsimile communication means for executing facsimile communication;

message transmitting means for transmitting a response message;

recording means for recording a matter;

calling tone signal detecting means for detecting a presence and an absence of a first signal in a frequency band corresponding to a frequency band of a calling tone signal;

speech signal detecting means for detecting a presence and an absence of a second signal in a frequency band outside the frequency band of the calling tone signal; and control means for activating the message transmitting means to transmit the response message and then activating the recording means to record the matter in cases where the calling tone signal detecting means continues to detect the absence of the first signal for a first predetermined time, for interrupting the recording of the matter by the recording means when the calling tone signal detecting means continues to detect the presence of the first signal and simultaneously the speech signal detecting means continues to detect the absence of the second signal for a second predetermined time during the recording of the matter by the recording means, and for starting and activating the facsimile communication means to execute the facsimile communication in cases where the calling tone signal detecting means continues to detect the presence or the first signal during said recording the matter and simultaneously the speech signal detecting means continues to detect the absence of the second signal for a third predetermined time.

* * * * *